United States Patent
Grootaert et al.

(10) Patent No.: US 6,825,300 B2
(45) Date of Patent: Nov. 30, 2004

(54) PROCESS FOR MAKING A FLUOROPOLYMER HAVING NITRILE END GROUPS

(75) Inventors: Werner M. A. Grootaert, Oakdale, MN (US); Klaus Hintzer, Kastl (DE); Kai Helmut Lochhaas, Neuoetting (DE); Gernot Löhr, Burgkirchen (DE); Franz März, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/714,681

(22) Filed: Nov. 14, 2003

(65) Prior Publication Data

US 2004/0106754 A1 Jun. 3, 2004

Related U.S. Application Data

(60) Provisional application No. 60/427,768, filed on Nov. 20, 2002.

(51) Int. Cl.[7] .................................................. C08F 2/00
(52) U.S. Cl. ........................ 526/217; 526/247; 528/288
(58) Field of Search ................................ 526/217, 247; 528/288

(56) References Cited

U.S. PATENT DOCUMENTS

| | | | |
|---|---|---|---|
| 2,567,011 A | | 9/1951 | Diesslin et al. |
| 2,732,398 A | | 1/1956 | Brice et al. |
| 2,809,990 A | | 10/1957 | Brown |
| 5,565,512 A | | 10/1996 | Saito et al. |
| 5,668,221 A | | 9/1997 | Saito et al. |
| 5,677,389 A | * | 10/1997 | Logothetis et al. ......... 525/340 |
| 5,877,264 A | * | 3/1999 | Logothetis et al. ........... 526/86 |
| 5,929,199 A | * | 7/1999 | Snow et al. ................. 528/288 |
| 6,518,366 B1 | | 2/2003 | Irie et al. |
| 2003/0073786 A1 | | 4/2003 | Irie et al. |

FOREIGN PATENT DOCUMENTS

| | | |
|---|---|---|
| EP | 0 219 065 A2 | 4/1987 |
| EP | 0 407 937 A1 | 1/1991 |
| EP | 0 661 304 A1 | 7/1995 |
| EP | 0 769 521 A1 | 4/1997 |
| EP | 0 784 064 A1 | 7/1997 |
| EP | 0 868 447 B1 | 10/1998 |
| EP | 0868447 * | 2/2000 |
| EP | 1211265 A1 * | 6/2002 |
| EP | 1 211 265 A1 | 6/2002 |
| WO | WO 96/24622 | 8/1996 |
| WO | WO 97/17381 | 5/1997 |
| WO | WO 00/09603 | 2/2000 |
| WO | WO-00/59959 * | 10/2000 |
| WO | WO 01/27194 A1 | 4/2001 |

OTHER PUBLICATIONS

Holleman–Wiberg, "*Lehrbuch der anorganischen Chemie*", Walter de Gruyter, Verlag, 1995, p. 101. Auflage, ISBN 3–11–012641–9.

* cited by examiner

*Primary Examiner*—David W. Wu
*Assistant Examiner*—Henry S Hu
(74) *Attorney, Agent, or Firm*—Brian E. Szymanski

(57) ABSTRACT

The present invention discloses a process for making a fluoropolymer having nitrile endgroups. The process comprises a free radical polymerization of one or more fluorinated monomers in the presence of a nitrile group containing salt or a nitrile group containing pseudohalogen compound.

11 Claims, No Drawings

PROCESS FOR MAKING A FLUOROPOLYMER HAVING NITRILE END GROUPS

CROSS REFERENCE TO RELATED APPLICATION

This application claims priority to U.S. Provisional Patent Application No. 60/427,768, filed Nov. 20, 2002.

FIELD OF THE INVENTION

The present invention relates to a process for making a fluoropolymer that has nitrile end groups.

BACKGROUND OF THE INVENTION

Fluoropolymers, i.e. polymers having a fluorinated backbone, have long been used in a variety of applications because of several desirable properties such as heat resistance, chemical resistance, weatherability, and UV-stability etc. Various examples are described in "Modern Fluoropolymers", edited by John Scheirs, Wiley Science 1997.

The known fluoropolymers include fluoroelastomers and fluorothermoplastics. Such fluoropolymers are generally copolymers of a gaseous fluorinated olefin such as tetrafluoroethylene (TFE), chlorotrifluoroethylene (CTFE) and/or vinylidene fluoride (VDF) with one or more comonomers such as hexafluoropropylene (HFP) or perfluorovinyl ethers (PVE) or non-fluorinated olefins such as ethylene (E) and propylene (P). Examples of fluoroelastomers include copolymers of TFE and PVE and copolymers of VDF and HFP. The fluoroelastomers may also contain cure site components so that they may be cured if desired. Suitable cure site comonomers include nitrile containing cure site monomers, such as nitrile containing olefins and nitrile containing fluorinated vinyl ethers. See, for example, WO 01/27194. EP 1 211 265 discloses that the use of nitrile containing comonomers, such as nitrile containing PVE, is rather expensive. The nitrile group-containing fluoroelastomer is said to be unstable and the properties of the cured product are said to be insufficient. Accordingly, EP 1 211 265 proposes to prepare nitrile group containing fluoroelastomers by converting amide group containing fluoroelastomers, in the presence of a dehydrating agent. This process has the disadvantage that an additional process step is needed which involves supplying additional energy. Accordingly, such a process increases the cost of manufacturing and causes inconveniences in the manufacturing process.

EP 868447 discloses the use of certain chain transfer agents (I—(CF$_2$)$_n$—CN) to introduce nitrile endgroups; however the compounds used are expensive, toxic and not easy to handle.

Finding another method of introducing nitrile groups into a fluoropolymer is desirable. Such method should be cost effective and allow for a convenient manufacturing process. Desirably, cured fluoropolymer products and in particular fluoroelastomers can be prepared from such fluoropolymers. Preferably, such cured fluoropolymers and elastomers have good physical and mechanical properties including for example heat resistance and good processibility.

SUMMARY OF THE INVENTION

In accordance with the present invention, when the present fluoropolymer is produced by free radical polymerization of fluorinated monomers in the presence of a nitrile group containing salt or a nitrile group containing pseudohalogen compound, a fluoropolymer results that has nitrile end groups. Such nitrile groups may be used in a so-called nitrile cure reaction as is known in the art to produce cured fluoropolymers and in particular to produce fluoroelastomers. Further the resulting fluoropolymer may have improved processibility. By the term "fluoropolymer" in connection with this invention is meant a polymer that has a fluorinated backbone, i.e. a partially or fully fluorinated backbone.

Generally, the amount of the nitrile group containing salt or nitrile group containing pseudohalogen compound is selected relative to the amount of initiator used to initiate the polymerization. Conveniently, the ratio of the amount of nitrile group containing salt or pseudohalogen compound to initiator is selected such that the amount of nitrile end groups in the resulting fluoropolymer according to Fourier Transform IR-measurements as set out in the examples is at least 0.0002, preferably at least 0.0004 and most preferably at least 0.001.

Still further, the present invention also provides a fluoropolymer composition for making a fluoroelastomer, comprising the above fluoropolymer and a cure composition.

DETAILED DESCRIPTION OF THE INVENTION

In accordance with the process of the invention, a nitrile group containing salt or pseudohalogen is used in the initiation of the free radical polymerization of fluorinated monomers to obtain a fluoropolymer with nitrile end groups. Suitable nitrile group containing salts for use in the invention include those that have the nitrile group in the anion of the salt and in particular correspond to the formula:

$$M-(X_a-CN)_n \qquad (I)$$

wherein M represents a mono- or multi-valent cation including a metal cation or an ammonium, X is O, S, Se or N, a has a value of 0 or 1 and n corresponds to the valence of the cation. Suitable cations M include organic (e.g. tetraalkylammonium cations) and inorganic cations. Particularly useful cations are ammonium and metal cations including mono-valent cations such as sodium and potassium as well as divalent cations such as calcium and magnesium. Examples of potassium salts include potassium cyanide, potassium cyanate and potassium thiocyanate. The salts wherein X is O or S and the cyanides are generally preferred.

Further, a pseudohalogen nitrile containing compound can be used. Pseudohalogen nitrile containing compounds are compounds that have one or more nitrile groups and that behave analogously to compounds in which the nitrile groups are replaced with a halogen, hence the term 'pseudohalogen'. Such compounds are well known and described in Holleman-Wiberg "Lehrbuch der anorganischen Chemie", Walter de Gruyter Verlag, 1995, 101. Auflage, ISBN 3-11-012641-9. Examples of pseudohalogen nitrile containing compounds for use with this invention include NC—CN, NC—S—S—CN, NC—Se—Se—CN, NCS—CN, NCSe—CN, Cl—CN, Br—CN, I—CN and NCN=NCN.

The amount of nitrile group containing salt and/or pseudohalogen compound is generally selected relative to the amount of the polymerization initiator. Preferably the ratio is set such that the amount of nitrile end groups according to FT-IR measurement method as described in the examples is at least 0.0002, preferably at least 0.0004 and most preferably at least 0.001. Typically, the molar ratio of the nitrile groups contained in the nitrile salt or pseudohalogen compound to initiator is between 1:0.1 and 1:100, preferably between 1:0.5 and 1:50.

The process of the invention can also be used when other inorganic ions such as bromide or iodide are present during the polymerization (as described in EP 407937). The free radical polymerization may be carried out in an organic solvent, can be an aqueous suspension polymerization or an aqueous emulsion polymerization. An aqueous emulsion polymerization is preferred in the present invention. When an aqueous emulsion polymerization is used, the nitrile group containing salt or pseudohalogen should preferably be water soluble. By the term "water soluble" it is meant that under the conditions of polymerization, the desired amount of the compound dissolves in the aqueous polymerization medium.

Initiator systems that may be used to initiate the free radical polymerization include initiator systems that generate free radicals through a redox reaction such as for example a combination of an oxidizing agent and a reducing agent. Suitable oxidizing agents include persulfates including for example ammonium persulfate, (APS) potassium persulfate (KPS) and sodium persulfate, preferably APS or KPS. Suitable reducing agents include sulfites, such as sodium sulfite, sodium bisulfite, a metabisulfite such as sodium or potassium bisulfite, pyrosulfites and thiosulfates, preferably $Na_2S_2O_5$, metal ions such as copper, iron, silver. Another redox based initiation system that can be used includes manganese systems such as those deriving from potassium permanganate, $Mn^{3+}$-salts (like manganese triacetate, manganese oxalate, etc.). The preferred metal salt is $KMnO_4$. Still further, the polymerization may be initiated with an initiator that decomposes thermally such as a persulfate. Thus, a persulfate can also be used on its own without a reducing agent. Peroxides may also be used as initiator systems, e.g. tert.-butylhydroperoxide with or without sodium hydroxymethanesulfinate is a preferred system.

The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization. Preferably the initiator is added until a conversion of monomer to polymer of 70 to 80% is achieved. One can also add part of the initiator at the start and the remainder in one or separate additional portions during the polymerization.

In an aqueous emulsion polymerization in accordance with the present invention, the fluorinated monomers and optionally further non-fluorinated monomers may be polymerized in the aqueous phase generally in the presence of a free radical initiator and a fluorinated surfactant or emulsifier, preferably a non-telogenic emulsifier. The emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid ammonium salt (APFO, described in U.S. Pat. No. 2,567,011), $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990).

Further emulsifiers that can be used include perfluoropolyethercarboxylate emulsifiers such as disclosed in EP 219065. However, APFO is the preferred emulsifier as it can be more readily removed from the polymerization product at the end of polymerization. The aqueous emulsion polymerization may also be carried out without addition of a fluorinated emulsifier. Such a polymerization is described in WO 96/24622 and WO 97/17381.

The aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization characterized by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

The polymerization systems may comprise auxiliaries, such as buffers and, if desired, complex-formers or chain-transfer agents including for example alkanes such as ethane and n-pentane, dialkyl ethers such as dimethyl ether, methyl tertiary butyl ether and chlorine, bromine and iodine containing chain transfer agents. The polymerization temperature may be from 10 to 180° C., typically 30° C. to 100° C. Polymerization pressures may be from 1 to 40 bar, typically 3 to 30 bar.

The fluoropolymer may have a partially or fully fluorinated backbone. Particularly preferred fluoropolymers are those that have a backbone that is at least 30% by weight fluorinated, preferably at least 50% by weight fluorinated, more preferably at least 65% by weight fluorinated. The term fluorinated should be understood to generally mean that hydrogen atoms of the backbone are replaced with fluorine atoms. However, the term is not meant to exclude the possibility that some of the hydrogen atoms are replaced with other halogens such as chlorine of bromine. Fluoropolymers having chlorine atoms on the backbone in addition to fluorine atoms may result from a polymerization involving chlorine containing monomers such as chlorotrifluoroethylene.

Examples of fluoropolymers for use in this invention include polymers of one or more fluorinated monomers optionally in combination with one or more non-fluorinated monomers.

Examples of fluorinated monomers include fluorinated $C_2$–$C_8$ olefins that may have hydrogen, chlorine atoms, both or neither such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$–$C_8$ olefins such as ethylene (E) and propylene (P):

Examples of perfluorovinyl ethers that can be used in the invention include those that correspond to the formula:

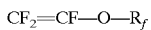

$CF_2=CF-O-R_f$ wherein $R_f$ represents a perfluorinated aliphatic group that may contain one or more oxygen atoms.

Particularly preferred perfluorinated vinyl ethers correspond to the formula:

$CF_2=CFO(R^a_fO)_n(R^b_fO)_mR^c_f$ wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable fluoroalkyl vinyl monomers correspond to the general formula:

$CF_2=CF-R^d_f$ or $CH_2=CH-R^d_f$ wherein $R^d_f$ represents a perfluoroalkyl group of 1 to 10, preferably 1 to 5 carbon atoms. A typical example of a perfluoroalkyl vinyl monomer is hexafluoropropylene.

According to a particular embodiment, the fluoropolymer is a polymer suitable for making a fluoroelastomer. Generally suitable fluoropolymers, including partially as well as perfluorinated polymers, for making a fluoroelastomer are substantially amorphous polymers that show hardly any melting point if at all. Such fluoropolymers are particularly suitable for providing fluoroelastomers, which are typically obtained upon curing of an amorphous fluoropolymer. Amorphous fluoropolymers include for example copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical.

Preferred amorphous fluoropolymers generally comprise from 20 to 85%, preferably 50 to 80% by moles of repeating units derived from VDF, TFE, CTFE, or combinations thereof copolymerized with one or more other fluorinated ethylenically unsaturated monomer, one or more non fluorinated $C_2$–$C_8$ olefins, such as ethylene and propylene, or combinations thereof. The units derived from the fluorinated ethylenically unsaturated comonomer when present generally contain between 5 and 45 mole %, preferably between 10 and 35 mole % of the fluorinated comonomer. The amount of non-fluorinated comonomer when present is generally between 0 and 50 mole %, preferably between 1 and 30 mole %.

Particularly preferred fluorinated copolymers are composed of tetrafluoroethylene and at least one perfluoro (alkylvinyl)ether as principal monomer units. In such copolymers, the copolymerized perfluorinated ether units constitute from about 15 to about 50 mole percent of total monomer units present in the polymer.

In an embodiment where a fluoroelastomer is desired, the fluoropolymer will typically be cured. The fluoropolymer may be cured by any of the methods known to those skilled in the art and will typically include a cure composition such that the fluoropolymer composition can be cured to a fluoroelastomer. The cure composition typically includes one or more components that cause the fluoropolymer chains to link with each other thereby forming a three dimensional network. Such components may include catalysts, curing agents, coagents, or combinations thereof.

The fluoropolymer obtained with the process of the present invention comprises nitrile end groups and may be cured using a cure composition known for curing nitrile containing fluoropolymers. For example, such cure composition may comprise one or more ammonia-generating compounds. "Ammonia-generating compounds" include compounds that are solid or liquid at ambient conditions but that generate ammonia under conditions of cure. Such compounds include, for example, hexamethylene tetramine (urotropin), dicyan diamide, and metal-containing compounds of the formula:

$A^{w+}(NH_3)_vY^{w-}$ where $A^{w+}$ is a metal cation such as $Cu^{2+}$, $Co^{2+}$, $Co^{3+}$, $Cu^+$, and $Ni^{2+}$; w is equal to the valence of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

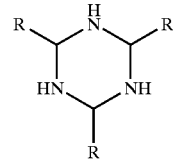

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

In addition to the nitrile end groups, nitrile group containing cure site monomers may be used in the polymerization process so as to increase the amount of nitrile groups in the fluoropolymer. Preferred useful nitrile group-containing cure site monomers include nitrile-containing fluorinated olefins and nitrile-containing fluorinated vinyl ethers, such as depicted below:

$CF_2=CF-CF_2-O-R_f-CN$ $CF_2=CFO(CF_2)_LCN$ $CF_2=CFO[CF_2CF(CF_3)O]_g(CF_2O)_vCF(CF_3)CN$ $CF_2=CF[OCF_2CF(CF_3)]_kO(CF_2)_uCN$ where, in reference to the above formulas: L=2–12; g=0–4; k=1–2; v=0–6; and u=1–4, $R_r$ is a perfluoroalkylene or a bivalent perfluoroether group. Representative examples of such a monomer include perfluoro(8-cyano-5-methyl-3,6-dioxa-1-octene), $CF_2=CFO(CF_2)_5CN$, and $CF_2=CFO(CF_2)_3OCF(CF_3)CN$. Typically 0.1–5 mol % of these compounds are used as cure site monomers. Preferably these cure site monomers are used in 0.2–3 mol %.

To cure the nitrile containing fluoropolymers all other well-known compounds can be used, like amino phenols (U.S. Pat. No. 5,677,389), ammonia salts (U.S. Pat. No. 5,565,512), amidoxines (U.S. Pat. No. 5,668,221) and other ammonia generating comp (PCT 00/09603) or imidates.

The fluoroelastomer compositions can be cured using one or more peroxide curatives along with the ammonia generating catalysts. Suitable peroxide curatives generally are those which generate free radicals at curing temperatures. Dialkyl peroxide and bis (dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di (tertiarybutylperoxy) hexyne-3 and 2,5-dimethyl-2,5-di (tertiarybutylperoxy) hexane. Other peroxides can be selected from such compounds as dicumyl peroxide, dibenzoyl peroxide, tertiarybutyl perbenzoate, a, a'-bis (t-butylperoxy-diisopropylbenzene), and di[1,3-dimethyl-3-(t-butylperoxy)-butyl]carbonate." Generally, about 3 parts of peroxide per 100 parts of perfluoroelastomer is used.

The curable fluoroelastomer compositions can include any of the adjuvants commonly employed in curable fluoroelastomer fomulations. For example, one material often blended with a fluoroelastomer composition as a part of the curative system is a coagent (sometimes also referred to as a co-curative) composed of a polyunsaturated compound that is capable of cooperating with the peroxide to provide a useful cure. These coagents can generally be added in an amount equal to between 0.1 and 10 parts per hundred parts fluoropolymer, preferably between 1 and 5 parts per hundred parts fluoropolymer. Examples of useful coagents include triallyl cyanurate; triallyl isocyanurate, tri (methylallyl isocyanurate); tris (diallylamine)-s-triazine; triallyl phosphite; N, N-diallyl acrylamide, hexaallyl phosphoramide; N, N, N', N'-tetraalkyl tetraphthalamide; N, N, N', N'-tetraallyl malonamide; trivinyl isocyanurate; 2,4,6-trivinyl methyltrisiloxane; and tri (5-norbomene-2-methylene) cyanurate. Particularly useful is triallyl isocyanurate.

Other useful coagents include the bis-olefins disclosed in EP 0 661 304 A1, EP 0 784 064 A1 and EP 0 769 521 A1.

The fluoropolymer produced in the process of this invention may also include halogens capable of participating in a peroxide cure reaction such as chlorine and in particular bromine or iodine. Such halogens may be included in the fluoropolymer through the use of a chain transfer agent that produces endgroups in the fluoropolymer that contain bromine or iodine or through the use of a comonomer in the polymerization that has chlorine, bromine or iodine atoms that are capable of participating in a peroxide cure reaction. When the fluoropolymer includes such halogens capable of participating in a peroxide cure reaction, the cure composition for such fluoropolymer will typically also contain a peroxide curative as described above and preferably also a coagent as described above.

The fluoropolymer composition may contain further additives, such as carbon black, stabilizers, plasticizers, lubricants, fillers, and processing aids typically utilized in fluoropolymer compounding, provided they have adequate stability for the intended service conditions.

The fluoropolymer compositions may be prepared by mixing a fluoropolymer, a cure composition and other additives in conventional rubber processing equipment. Such equipment includes rubber mills, internal mixers, such as Banbury mixers, and mixing extruders.

The invention will now be further illustrated with reference to the following examples without the intention to limit the invention thereto. All parts and percentages are by weight unless indicated otherwise.

EXAMPLES

Test methods
Determination of Nitrile Endgroups

A Fourier transform infrared spectroscopy (FT-IR) measurement was used to determine the effectiveness of the nitrile group containing compounds to introduce nitrile end groups in the fluoropolymer.

The measurements were performed by FT-IR in a transmission technique. The measured samples had a film thickness of 300 to 350 $\mu$m. The wave number of the nitrile peak of interest is 2262 to 2263 cm$^{-1}$ (CN group).

To quantify the amount of nitrile end groups R of fluoropolymers two IR spectra were taken. One from the nitrile containing sample and one from a reference sample (without CN groups). In a range between 2200 cm$^{-1}$ and 2800 cm$^{-1}$ wave numbers the spectrum from the reference sample was substracted from the spectrum of the nitrile containing sample. The peak height A of CN group (2262 to 2263 cm$^{-1}$) was determined using the resulting difference spectrum. The peak height A was divided by the peak height B of the C—F-group (2356 to 2360 cm$^{-1}$) of the sample spectrum.

$$R = \frac{A_{sample\ spectrum-reference\ spectrum}}{B_{sample\ spectrum}}$$

Mooney Viscosity

Mooney viscosities were determined in accordance with ASTM D 1646. Unless otherwise noted, the Mooney viscosity was determined from compositions containing only fluoropolymer using a 1 minute pre-heat and a 10 minute test at 121° C. (ML 1+10 @ 121° C.).

Example 1

A 4 liter kettle was charged with 2800 ml deionized water under oxygen-free conditions. 9 g C$_7$F$_{15}$COONH$_4$ (APFO) and 6 g KSCN were added. After heating to 70° C., 96 g tetrafluoroethylene (TFE) and 247 g perfluoromethylvinyl ether (PMVE) were added. The reaction was initiated with the addition of 15 g ammonium persulphate (APS), dissolved in 110 ml deionized water. At 12 bar pressure and a temperature of 70° C., 23 g TFE and 14 g PMVE were fed over a period of 363 min. The resulting latex had a solids content of 4.3% and was coagulated with a solution of MgCl$_2$. The polymer was dried at 130° C.

FT-IR analysis showed a significant content of nitrile functions (peak at 2262 cm$^{-1}$). According to the above described method a value of 0.039 resulted.

Example 2

A 4 liter reaction kettle was charged with 2900 ml deionized water. 9 g C$_7$F$_{15}$COONH$_4$ (APFO) and 6 g KSCN were added. After heating to 70° C., 94 g TFE and 243 g perfluoromethylvinyl ether (PMVE) were added. The reaction was initiated with the addition of 6 g ammonium persulphate (APS) dissolved in 50 ml deionized water.

At 16 bar pressure and 70° C., 490 g TFE and 418 g PMVE were fed over a period of 404 min. The resulting latex had a solids content of 21.6% and was coagulated with a solution of MgCl$_2$. The polymer was dried at 130° C.

The isolated polymer had a nitrile end group value of 0.008.

The Mooney (1+10@ 121° C.) viscositiy was 99.

Example 3

A 4 liter reaction kettle was charged with 2700 ml deionized water. 9 g APFO and 5 g KOCN were added. After heating to 70° C., 97 g TFE and 253 g PMVE were added. The reaction was initiated with the addition of 6 g APS, dissolved in 50 ml deionized water. At 12 bar pressure and 70° C., 51 g TFE and 43 g PMVE were fed over a period of 73 min. The resulting latex had a solids content of 5.1%. The polymer was dried at 130° C.

FT-IR analysis showed a nitrile endgroup value of 0.067.
The Mooney (1+10 @ 121° C.) viscositiy was 39.2.

Example 4

A 4 liter reaction kettle was charged with 2680 ml deionized water. 9 g APFO and 5 g KOCN were added. After heating to 70° C., 98 g TFE and 256 g PMVE were added. The reaction was initiated with addition of 9 g APS, dissolved in 80 ml deionized water. At 12 bar pressure and 70° C., 332 g TFE and 283 g PMVE were fed over a period of 338 min. The resulting latex had a solids content of 18.6%.

FT-IR analysis showed a nitrile endgroup value of 0.016.

The Mooney (1+10 @ 121° C.) viscositiy was 5.5.

Example 5

A 4 liter reaction kettle was charged with 2900 ml deionized water. 9 g $C_7F_{15}COONH_4$ (APFO) and 4 g KCN were added. After heating to 70° C., 94 g TFE and 246 g perfluoromethylvinyl ether (PMVE) were added. The reaction was initiated with the addition of 6 g ammonium persulphate (APS) dissolved in 50 ml deionized water.

At 12 bar pressure and 70° C., 500 g TFE and 430 g PMVE were fed over a period of 330 min. The resulting latex had a solids content of 25.5%. The polymer was dried at 130° C.

The isolated polymer had a nitrile end group value of 0.002.

The Mooney (1+10 @ 121° C.) viscositiy was 133.

Comparative example

Under oxygen-free conditions, a 4 liter kettle was charged with 2800 mL deionized water. 15.9 g $C_7F_1sCOONH_4$ (APFO) was added. After heating to 71° C. 86 g tetrafluoroethylene (TFE) and 205 g perfluoromethylvinyl ether (PMVE) were added. The reaction was initiated with addition of 3 g ammonium peroxodisulphate (APS) dissolved in 30 mL deionized water. At 11 bar pressure and 71° C. 202 g TFE and 152 g PMVE were fed over a period of 132 min.

The resulting latex had a solid content of 13.0%.

What is claimed is:

1. Process for making a fluoropolymer having nitrile endgroups, said process comprising a free radical polymerizing one or more fluorinated monomers in the presence of a nitrile group containing salt or a nitrile group containing pseudohalogen compound.

2. Process according to claim 1 wherein polymerizing is an aqueous emulsion polymerization and said nitrile group containing salt is a water soluble salt.

3. Process according to claim 2 wherein said nitrile group containing salt corresponds to the formula:

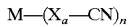

wherein M represents a mono- or multi-valent cation, X is O, S, Se or N, a is 0 or 1 and n corresponds to the valence of the cation.

4. Process according to claim 3 wherein said nitrile group containing salt is selected from an ammonium salt, alkali metal salt, alkaline earth metal salt and tetraalkylammonium salt of cyanate, thiocyanate, or cyanide.

5. Process according to claim 1 wherein said fluorinated monomers comprise one or more fluorinated olefins and optionally one or more fluorinated vinyl ethers.

6. Process according to claim 1 wherein said fluorinated monomers comprise one or more fluorinated olefins and at least one fluorinated monomer comprising a nitrile group.

7. Process according to claim 1 wherein said polymerization further involves one or more non-fluorinated comonomers.

8. Process according to claim 1 wherein said fluoropolymer is a substantially amorphous fluoropolymer.

9. Method of making a fluoroelastomer composition comprising combining a fluoropolymer through a process as defined in claim 1 with a cure composition.

10. Method of making a fluoroelastomer comprising combining a fluoropolymer through a process as defined in claim 1 with a cure composition and curing the thus obtained fluoroelastomer composition.

11. A nitrile group containing fluoroelastomer which is in the form of a solid, has nitrile groups at both ends and is represented by the formula

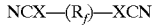

where X=O or S and $R_f$ is a divalent fluoroelastomer chain.

* * * * *

UNITED STATES PATENT AND TRADEMARK OFFICE
CERTIFICATE OF CORRECTION

PATENT NO. : 6,825,300 B2
DATED : November 30, 2004
INVENTOR(S) : Grootaert, Werner M.A.

It is certified that error appears in the above-identified patent and that said Letters Patent is hereby corrected as shown below:

Column 6,
Line 50, "$R_r$" should be shown as -- $R_f$ --

Column 7,
Line 8, "a, a'-bis" should be shown as -- $\alpha,\alpha'$-bis --
Line 27, "norbomene" should be shown as -- norbornene --

Column 9,
Line 33, "$C_7F_1sCOONH_4$" should be shown as -- $C_7F_{15}COONH_4$ --

Signed and Sealed this

Tenth Day of May, 2005

JON W. DUDAS
*Director of the United States Patent and Trademark Office*